Sept. 15, 1970         S. D. SAXON         3,528,730
MULTI-IMAGE SYSTEM
Filed Oct. 2, 1967         2 Sheets-Sheet 1
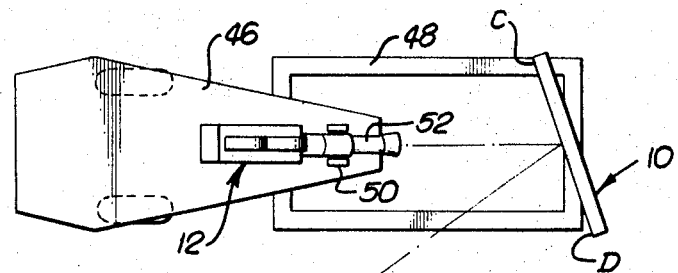
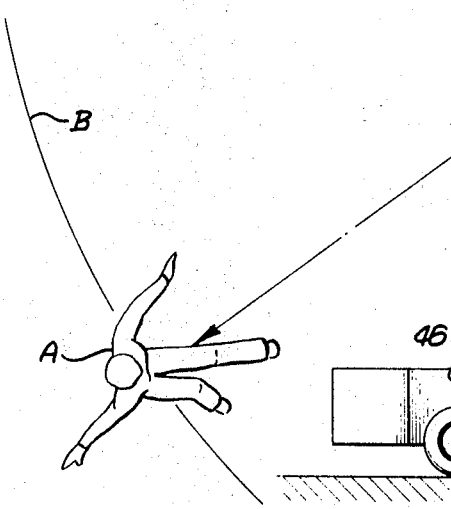
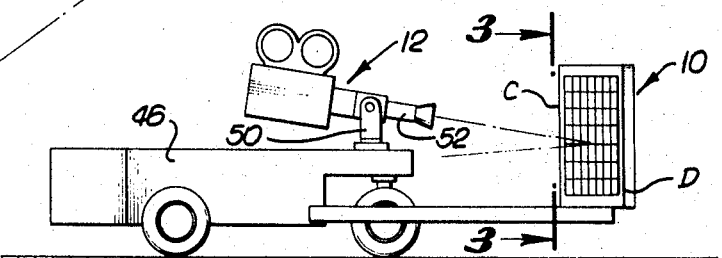
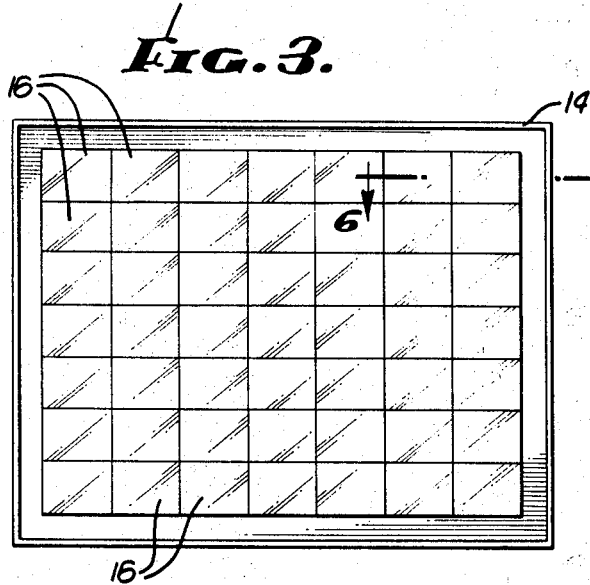
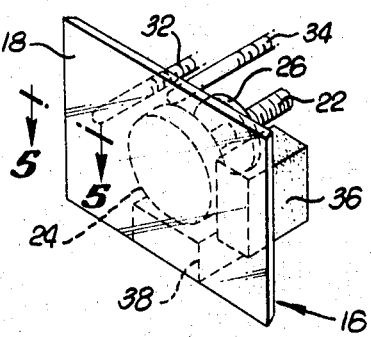
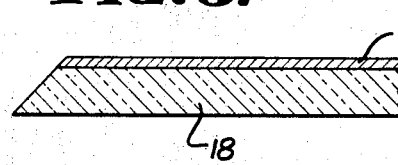
INVENTOR.
SPENCER DAVID SAXON
By Flam and Flam
ATTORNEYS.

Sept. 15, 1970          S. D. SAXON          3,528,730
MULTI-IMAGE SYSTEM
Filed Oct. 2, 1967          2 Sheets-Sheet 2
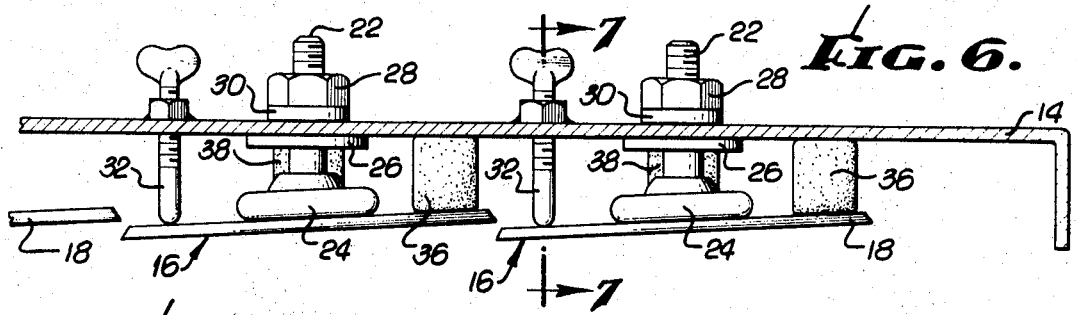
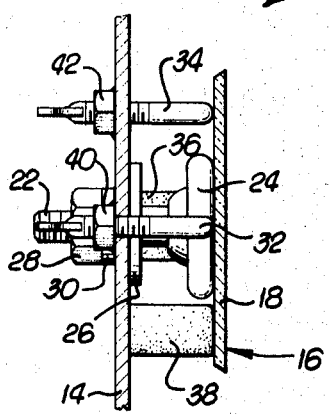
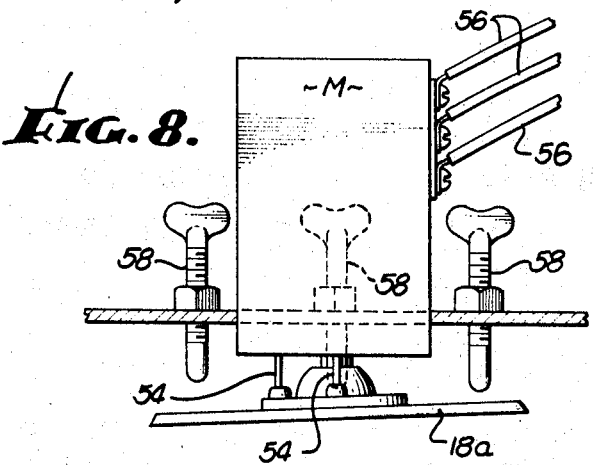
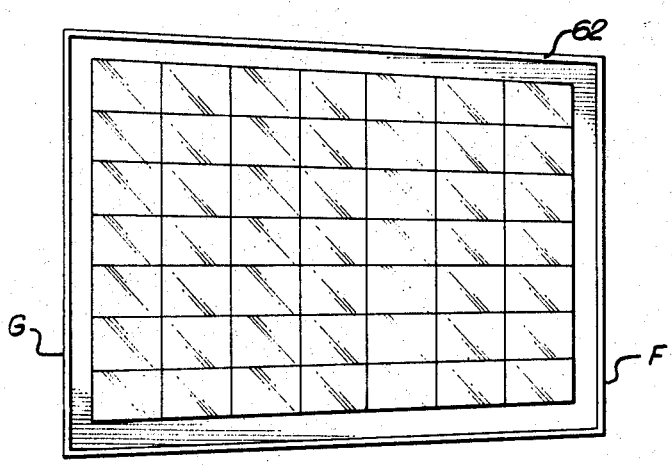
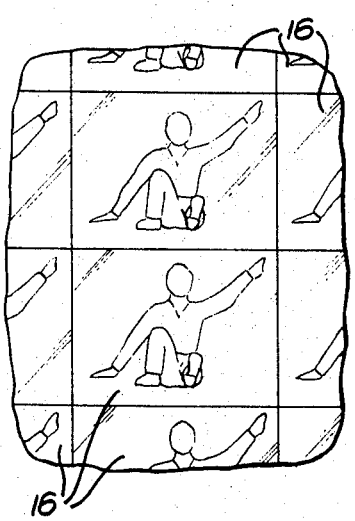
INVENTOR.
SPENCER DAVID SAXON
By Flam and Flam
ATTORNEYS.

United States Patent Office

3,528,730
Patented Sept. 15, 1970

3,528,730
MULTI-IMAGE SYSTEM
Spencer David Saxon, 5334 Woodman Ave.,
Van Nuys, Calif. 91401
Filed Oct. 2, 1967, Ser. No. 672,363
Int. Cl. G03b 15/00
U.S. Cl. 352—85                                         9 Claims

ABSTRACT OF THE DISCLOSURE

The multi-image system comprises a mirror array 10 and a camera 12 preferably mounted on a common support. The mirror array includes a plurality of identical mirror modules 16 indivdually mounted on a frame 14 for adjustment about horizontal and vertical axes whereby each camera module can direct to the camera lens a similar image of the subject A. The camera pans and tilts about axes passing through the operative center of its lens. The camera preferably incorporates a zoom lens to achieve unusual reiterative effects.

BRIEF SUMMARY OF THE INVENTION

This invention relates to a system for providing multiple images on motion picture or still film. Such multiple images may be desired to achieve various special effects. Heretofore, it has been proposed to accomplish this object by special printing procedures such as involving masking techniques in conjunction with indexing and sequential exposures. Such known procedures are complicated and, if carried out rapidly, involve the use of expensive specialized equipment. It has also been proposed to provide image splitting lens systems. These systems are not satisfactory for the reason, among others, that the number of images cannot be changed, at least during the course of filming. Changing the number of images may be highly desirable to achieve certain effects.

The primary object of this invention is to provide a system for simultaneously photographing a plurality of images in which a conventional camera lens system is used. Another object of this invention is to provide a system in which the number of images may be selected merely by operating the control of a conventional zoom lens.

In order to accomplish these objects, I provide an array of mirrors. The mirrors are substantially rectangular and are placed substantially in edge-to-edge relationship say, seven high and seven wide. Each of the mirrors is in screen proportion; hence, the array of forty-nine mirrors is likewise in screen proportion. The mirrors can be individually adjusted so that with respect to a camera spaced from the mirror system, each reflects the common subject. By using a zoom control, the camera field can be smoothly expanded, say, from the single central mirror continuously to encompass the entire forty-nine frames. Hence, the camera sees first a single large image, then nine smaller identical images, then sixteen still smaller images, then twenty-five, and finally, forty-nine images. The reverse zoom control can be accomplished with equal ease. With the zoom control set to encompass a single mirror, the camera can be panned or tilted to achieve an unusual reiterative effect wherein an image moves off camera as an identical image moves on. Other special effects are also possible, as by setting some of the mirrors on one subject and other mirrors on another subject.

Another object of this invention is to provide apparatus that permits panning and tilting without affecting the setting of the individual mirrors. For this purpose, I provide a special support for the camera whereby the axes of pan and tilt substantially pass through the effective center of the lens system. Accordingly, whatever the angular position of pan or tilt, the relative position of the center of the camera lens system and the individual mirrors remains the same.

In ordinary use, the entire array of mirrors is tilted in order to minimize the angular adjustments of the individual mirrors. In this manner, the fringe effect between successive mirrors is minimized and the field is maximized. This results in a certain "keystoning" effect due to the fact that the last column of mirrors is farther away from the camera lens than the first column. Another object of this invention is to compensate for this effect by providing a trapezoidal configuration to the mirrors whereby compensation is provided.

Another object of this invention is to provide a multi-image system of this character in which relatively conventional panning is readily achieved, and in which the setting of the mirrors is undisturbed to maintain the multi-image effect as desired under zoom control. For this purpose, the mirror system itself is carried on the same movable support as the camera, as for example, a conventional crab dolly. Accordingly, panning is accomplished by moving the dolly.

This invention possesses many other advantages and has other objects which may be made more clearly apparent from a consideration of several embodiments of the invention. For this purpose, there are shown a few forms in the drawings accompanying and forming part of the present specification, and which drawings are true scale. These forms will now be described in detail, illustrating the general principles of the invention; but it is to be understood that this detailed description is not to be taken in a limiting sense, since the scope of the invention is best defined by the appended claims.

BRIEF DESCRIPTION OF THE DRAWINGS

FIG. 1 is a top plan view of a system incorporating the present invention.

FIG. 2 is a side elevational view of the system shown in FIG. 1.

FIG. 3 is an enlarged front elevational view of the mirror array.

FIG. 4 is a pictorial view of one of the individual mirror modules.

FIG. 5 is an enlarged fragmentary sectional view taken along a plane corresponding to line 5—5 of FIG. 4, showing the mirror structure.

FIG. 6 is an enlarged fragmentary sectional view taken along a plane corresponding to line 6—6 of FIG. 3 showing the manner in which the mirror modules are mounted.

FIG. 7 is a fragmentary sectional view taken along a plane corresponding to line 7—7 of FIG. 6 showing the adjustment mechanism.

FIG. 8 is a fragmentary sectional view similar to FIG. 7 but illustrating a motor unit for remote control of the mirror module.

FIG. 9 is a front elevational view similar to FIG. 3 of a modified mirror array.

FIG. 10 is an enlarged fragmentary sectional view showing images reflected by the mirror modules.

DETAILED DESCRIPTION

The system shown in FIG. 1 comprises in its most elemental form a mirror array 10 and a camera 12. While my invention contemplates the use of a still camera, a motion picture camera is shown whereby additional effects are achieved. The mirror array projects a plurality of similar images of the subject A to the camera 12, and as depicted in FIG. 10, the mirror array 10 is specially constructed to accomplish this purpose.

The mirror array 10, as shown most clearly in FIGS. 3 through 7, includes a frame 14 upon which forty-nine mirror modules 16 are mounted. A different number of modules could be provided. The mirror modules 16 are identical; hence, a detailed description of one will suffice as a description of all.

One of the modules 16, as shown in FIG. 4, comprises a mirror element 18 of rectangular configuration on the front surface of which silver or other reflective material 20 is deposited or applied. All edges of the mirror are rearwardly beveled. Projecting rearwardly from the back of the mirror 18 is a mounting stud 22 by the aid of which the mirror module 16 is supported by the frame 14. The stud 22 is connected to the mirror 18 by the aid of a coupling 24 that allows at least limited universal type angular movement between the coupled parts. The coupling 24 has a pad area cemented or otherwise secured at the center of the rear surface of the mirror 18. The universal type coupling 24 and the stud 22, for purposes of convenience, may comprise standard furniture glide. The axis of universal movement of the coupling 24 lies close to the frontal reflecting plane of the mirror 18 so that the mirror is confined within an imaginary prismatic volume extending axially of the stud 22 with the edges of the mirror falling quite close to the sides of the prismatic volume throughout substantial ranges of angular movement of the mirror module. Adjacent mirror modules may thus be adjusted without interference, while the aggregate field covered by the mirror modules is maximized.

The frame 14, as shown in FIG. 6, has an array of forty-nine mounting holes for each of the studs 22. The center-to-center spacing of the holes corresponds to the horizontal and vertical dimensions of the mirror modules whereby the mirror modules may be moved to a front coplanar position in which the mirror edges are virtually touching. The rearward bevel insures this result.

The studs, as shown in FIG. 7, each carry backing plates 26 threaded thereon and spaced from the universal connection 24. The backing plate 26 engages the frontal surface of the frame 14, and the nut 28 engages the rear surface of the frame 14 through a washer 30. Accordingly, the mirrors are mounted. By adjustment of the plates 26, the mirror modules are aligned.

The angular orientation of the mirror element 18 of each module is determined by a pair of adjustment screws 32 and 34 (FIGS. 6 and 7). The adjustment screw 32 is located to the left of the coupling as viewed in FIG. 4, but is in horizontal alignment with its operative center. A compression spring on the opposite side of the coupling 24 urges the mirror to engage the end of the screw 32, whereby the angular position of the mirror about the vertical axis is determined. The spring, in the present instance, is in the form of a sponge or foam rubber pad 36. The pad 36 is substantially rectangular and one end is adhered, as by cement, to the rear surface of the mirror 18. The other end of the pad 36 is stopped by the frame 14 (FIG. 6), whereby spring tension is applied. A tension spring could be provided instead on the same side as the screw 32; optionally, a coupling could be provided between the screw 32 and the mirror 18.

The angular position of the mirror about a horizontal axis is determined by the screw 34. The screw is located above the coupling 24 in vertical alignment with its operative center. A sponge rubber pad 38 beneath the coupling 24 is adhered to the rear surface of the mirror and maintains a following engagement between the mirror and the end of the screw 34.

The screws 32 and 34 (FIGS. 6 and 7) pass through apertures in the frame 14 and through nuts 40 and 42 welded to the rear surface thereof. The ends of the screws 32 and 34 have wing ends in order to facilitate manual adjustment. By such adjustment, the angular positions of all of the mirror modules are determined.

All of the mirrors can be adjusted so that their front surfaces are coplanar. From such coplanar position, the individual mirrors can be adjusted without interference with the adjacent mirrors.

In the position illustrated in FIG. 1, the frame 14 of the mirror array 10 is angled so that the camera 12 by reflection is directed at the subject A. If the mirrors are coplanar, a single image will be seen by the camera. The edges of the mirrors will be out of focus, and if they meet quite precisely, the field will be undisturbed. Now, by individually adjusting the mirrors, each can be angularly oriented so as to project the same image to the camera lens, as shown in FIG. 10. The photographed frame of the camera, accordingly, is divided into forty-nine adjacent components, each virtually identical except for the slight disparity in angularity from camera to mirror to subject.

In order to pan the field along the arc B, the camera 12 and the mirror array 10 are moved as a unit. For this purpose, both components are mounted on camera dolly 46 of known construction. A forwardly projecting frame 48 serves as a support for the mirror array 10. Panning is achieved by moving the camera dolly so that the unit moves angularly about a vertical axis located near the mirror array.

In order to achieve an altogether different effect, the distance between the camera 12 and the mirror array 10 can first be adjusted so that a single mirror module subtends the entire filmed frame. Then the camera can be panned or tilted from mirror to mirror whereby an unusual reiterative effect is achieved in which the image moves off camera as an identical image moves on. In order to ensure a proper result in this and other modes, each mirror has the same aspect ratio as the camera film.

In order to permit panning and tilting movement of the camera without affecting the set position of the individual mirror modules, the camera 12 is mounted for movement about pan and tilt axes that pass through the operative center of its lens system. For this purpose, an offset bracket section 50 (FIGS. 1 and 2) provides a horizontal adjustment axis as at $x$ that passes through the operative center of the lens system, and as at $z$ a vertical adjustment that likewise passes through the operative center of the lens system. Accordingly, whatever the angular position of the camera, the distance from the lens to mirror to the subject remains the same.

In order to obtain still more interesting effects, a zoom lens 52 may be incorporated in the camera 12. When using the zoom lens, the mirror array 10 is positioned at a distance from the camera which allows the lens in its longest focal length position to photograph entirely within the limits of one mirror module. Thus, the lens can be adjusted from its longest focal length position in which it precisely encompasses one mirror module within the field of view, to a short focal length position in which all of the mirror modules are encompassed. By using a zoom lens in such manner, an unusual reiterative effect can be achieved whereby the viewer first sees a single image, then to four, nine, sixteen, twenty-five and finally, forty-nine identical images. The reverse operation is likewise possible, and this effect may be achieved in combination with pan or tilt movement of the camera, and at various rates. Since each mirror has the same aspect ratio as the camera film, four, nine, sixteen, twenty-five and forty-nine mirrors likewise have the same aspect ratio.

Additional effects may be achieved by utilizing a motor mechanism M (FIG. 8). The mechanism M provides two actuator rods 54 for achieving the adjustment of the mirror 18 about horizontal and vertical axes. The rods 54, in this instance, are coupled to the mirror by universal joints. The mechanism M may be remotely controlled by switches at a console (not shown) adjacent the camera or a monitor where the field of view of the camera may be perceived. Leads 56 connect the mechanism to the console. By such means it is possible quickly to achieve a desired adjustment of the mirror modules.

In order to achieve still different effects, four stop screws 58 are provided that surround the mirror in substantially rectanguar array. These screws may be preset so that the mirrors can be quickly shifted from a first adjusted position to second or other positions. The console control can also be operated by digital or analog program information recorded on punch tape or the like. Except as otherwise described, the form on FIG. 8 is the same as the first described form.

As indicated in FIG. 1, the edge C of the array 10 is closer to the camera than the edge D. Due to this fact, the height of the frame 14 at the edge C will photograph slightly greater than at the edge D, and screen proportion will be slightly off. The device shown in FIG. 9 compensates for this effect.

The frame 62 is similar to the frame 14, except that it has a keystone or trapezoidal configuration. The individual mirror modules are cut correspondingly to fit edge-to-edge within this frame. Accordingly, by locating the mirror array so that the edge F is closer to the camera than the edge G, the keystoning effect is compensated. By inverting the frame, the array can be angled right or left as desired, since the array is symmetrical about a horizontal axis.

In all instances, the camera is focused not on the mirrors themselves, but instead upon the subject remote from the mirrors. Accordingly, the edges of the mirrors are out of focus and do not appear on the photographed frame.

The mirror array can be used to achieve interesting projection effects. If the mirrors are oriented generally in random fashion, and the entire array placed from the projector a distance to subtend the projected beams, individual segments of the frame are then poistioned at random places on the projection screen. The subject matter becomes disjointed, but somehow, functionally connected in the mind's eye. These effects may be compounded by projecting into the mirror system a multi-image produced by photography methods herein described. Each projected segment may at times then be substantially the same.

I claim:

1. In a multi-image system: a support; an array of mirrors carried by the support; means adjustably mounting each of the mirrors for individual tilting movement whereby a group of said mirrors may be positioned simultaneously to reflect a common subject to a focal point; said mirrors having edges located closely whereby said mirrors occupy a substantial portion of the area of the said array; and a camera having a zoom lens system facing the array of mirrors, and located from said array of mirrors so that in the longest focal length position one of said mirrors substantially fills a single frame on the light sensitive element in the camera.

2. The combination as set forth in claim 1 together with a common mounting for said mirror array and said camera whereby said camera and said mirror array can be panned as a unit by movement of said common mounting.

3. In a multi-image system: a support; an array of mirrors carried by the support; means adjustably mounting each of the mirrors for individual tilting movement whereby a group of said mirrors may be positioned simultaneously to reflect a common subject to a focal point; said mirrors having edges located closely whereby said mirrors occupy a substantial portion of the area of the said array; a camera having a lens system facing said array; and means mounting said camera for pan and tilt about axes passing through the operative center of said lens system whereby the reflection angles between the center of the lens and each of the mirrors remains fixed during pan and tilt movement.

4. The combination as set forth in claim 3 together with a camera having a zoom lens system, and located from said array of mirrors so that in the longest focal length position one of said mirrors substantially fills the camera frame.

5. In a multi-image system:
(a) a support;
(b) a plurality of flat mirrors carried by the support, each mirror having four sides with the opposite sides substantially parallel to each other, each mirror having substantially the same width to height screen proportion with an aspect ratio materially in excess of 1.0, the mirrors being correspondingly oriented;
(c) means individually mounting said mirrors in close side by side relationship for individual adjustment to positions in which said mirrors have coplanar reflecting surfaces with the edges of the mirrors substantially contiguous and for individual tilting movement whereby each of said mirrors may be adjusted to reflect a common subject; said mirrors being positioned to form an array comprising a number of mirrors wide by a number of mirrors high with said numbers being at least approximately equal and both in excess of one, whereby groups of mirrors in the series (1, 4, 9, 16 . . . ) are in the same screen proportion and aspect ratio;
(d) means for releasably holding said mirrors in their individual adjusted positions; and
(e) a camera located at the common focal point of the images reflected by said mirrors and focused on said common subject.

6. The combination as set forth in claim 5 in which said mirror array is trapezoidal with the side edges substantially vertical and the top and bottom edges converging toward each other, the outer edges of all individual mirrors being correspondingly trapezoidal whereby a reverse keystoning compensation is accomplished when the shorter side edge is located closer to the camera than the other.

7. The combination as set forth in claim 5 together with a common movable mounting for the mirror array support and said camera whereby said camera and mirror array can be panned as a unit by movement of said mounting.

8. The combination as set forth in claim 5 in which said camera has a zoom lens system facing said array of mirrors and located from said array of mirrors so that in a long focal length position one of said mirrors substantially fills a single frame on the light sensitive element in the camera.

9. The process of photographing multiple images which comprises:
(a) arraying a plurality of flat mirrors in a common photography field;
(b) individually adjusting the mirrors so that the mirrors reflect through a common focal point, individually coherent images;
(c) thereafter simultaneously photographing the multiple images provided by said mirrors by the aid of a variable focal length camera having a lens system the operative center of which is located substantially at said focal point and focused on said images; and
(d) changing the focal length of the camera while recording camera images comprised of changing numbers of mirror images.

(References on following page)

References Cited

UNITED STATES PATENTS

| | | | |
|---|---|---|---|
| 1,971,486 | 8/1934 | Jennings et al. | 352—85 |
| 2,707,903 | 5/1955 | Trombe. | |
| 2,727,428 | 12/1955 | Herman | 352—69 |
| 2,987,961 | 6/1961 | Cotton et al. | |
| 3,009,391 | 11/1961 | Zagieboyld et al. | 350—292 |
| 3,187,629 | 6/1965 | Rowell. | |
| 3,254,207 | 5/1966 | Lowell. | |
| 3,201,797 | 8/1965 | Roth | 352—85.4 XR |
| 3,441,343 | 4/1969 | Piron et al. | |
| 1,424,886 | 8/1922 | Douglass | 95—18 |
| 2,178,228 | 10/1939 | Goldsmith. | |
| 3,027,807 | 4/1962 | Barcus et al. | 350—289 |
| 3,140,341 | 7/1964 | Holt. | |
| 3,142,223 | 7/1964 | Vetter | 352—69 |
| 3,236,150 | 2/1966 | Miller. | |

FOREIGN PATENTS

| | | |
|---|---|---|
| 17,393 | 12/1915 | Great Britain. |
| 599,467 | 8/1933 | Germany. |

NORTON ANSHER, Primary Examiner

M. H. HAYES, Assistant Examiner

U.S. Cl. X.R.

350—117, 292, 299, 305; 352—70, 140, 243